United States Patent
Akbari

(10) Patent No.: US 8,711,831 B2
(45) Date of Patent: Apr. 29, 2014

(54) FRONT END FOR RF TRANSMITTING-RECEIVING SYSTEMS WITH IMPLICIT DIRECTIONAL CONTROL AND TIME-MULTIPLEXING METHOD IN SUBMICRON TECHNOLOGY

(75) Inventor: Rahim Akbari, Graz (AT)

(73) Assignee: Maxim Integrated Products, Inc., San Jose, CA (US)

( * ) Notice: Subject to any disclaimer, the term of this patent is extended or adjusted under 35 U.S.C. 154(b) by 806 days.

(21) Appl. No.: 12/919,601

(22) PCT Filed: Jan. 30, 2009

(86) PCT No.: PCT/EP2009/051095
§ 371 (c)(1),
(2), (4) Date: Aug. 26, 2010

(87) PCT Pub. No.: WO2009/106403
PCT Pub. Date: Sep. 3, 2009

(65) Prior Publication Data
US 2010/0329234 A1 Dec. 30, 2010

(30) Foreign Application Priority Data
Feb. 29, 2008 (DE) .......................... 10 2008 000 473

(51) Int. Cl.
*H04B 1/48* (2006.01)
(52) U.S. Cl.
USPC ........... 370/347; 370/284; 370/285; 370/492; 330/258; 330/255; 330/301
(58) Field of Classification Search
USPC ........ 330/2, 258, 301, 255, 253, 51; 370/347, 370/492, 284–285
See application file for complete search history.

(56) References Cited

U.S. PATENT DOCUMENTS 6,211,659 B1 * 4/2001 Singh .......................... 323/315
(Continued)

FOREIGN PATENT DOCUMENTS

| EP | 1468487 | 10/2007 |
| WO | 02/054586 | 7/2002 |

OTHER PUBLICATIONS

International Preliminary Report on Patentability, issued Sep. 28, 2010.
International Search Report, issued May 13, 2009.
Vincent Knopik, Didier Belot, "0.18 um Thin Oxide CMOS Transceiver Front-End with Integrated $T_x/R_x$ Commutator for Low Cost Bluetooth Solutions" European Solid-State Circuits, 2003, Esscirc '03. Conference on Sep. 16-18, 2003, Piscataway, NY, USA, IEEE, Sep. 16, 2003, pp. 675-678.

(Continued)

*Primary Examiner* — Charles C Jiang
*Assistant Examiner* — Mohamed Kamara
(74) *Attorney, Agent, or Firm* — North Weber & Baugh LLP

(57) ABSTRACT

A new design configuration of an RF-transceiver front end is proposed. The Power Amplifier (PA) output stage of the transceiver comprises a cascode circuitry of N-type transistors with open-drain-configuration. The cascode-transistor is acting as a common-gate-transistor, whose gate is controlled to block the transmitting-(TX) path. The Low Noise Amplifier (LNA) input stage uses a common-gate configuration of a p-channel MOS-transistor that is controlled by the voltage at the bulk terminal. Lifting the bulk potential of this PMOS-transistor above its source potential disables the receiving-(RX)-path. This design allows low cost implementation for TDMA-RF-transceivers especially for Bluetooth-Solutions. The number of external components is reduced. No additional TX/RX switch is required. The same port and the same matching elements for the antenna's bandwidth adaptation are used for both the TX-path and the RX-path.

11 Claims, 4 Drawing Sheets

(56) References Cited

U.S. PATENT DOCUMENTS

| | | |
|---|---|---|
| 6,930,546 B2 * | 8/2005 | Floyd ............................ 330/51 |
| 2005/0107043 A1 | 5/2005 | Avasarala et al. |
| 2005/0227652 A1 | 10/2005 | Kang et al. |
| 2006/0040621 A1 | 2/2006 | Rofougaran |
| 2008/0036540 A1 | 2/2008 | Frohlich et al. |

OTHER PUBLICATIONS

German Patent Office Search Report 10 2008 000473.1, issued Mar. 15, 2008.

* cited by examiner

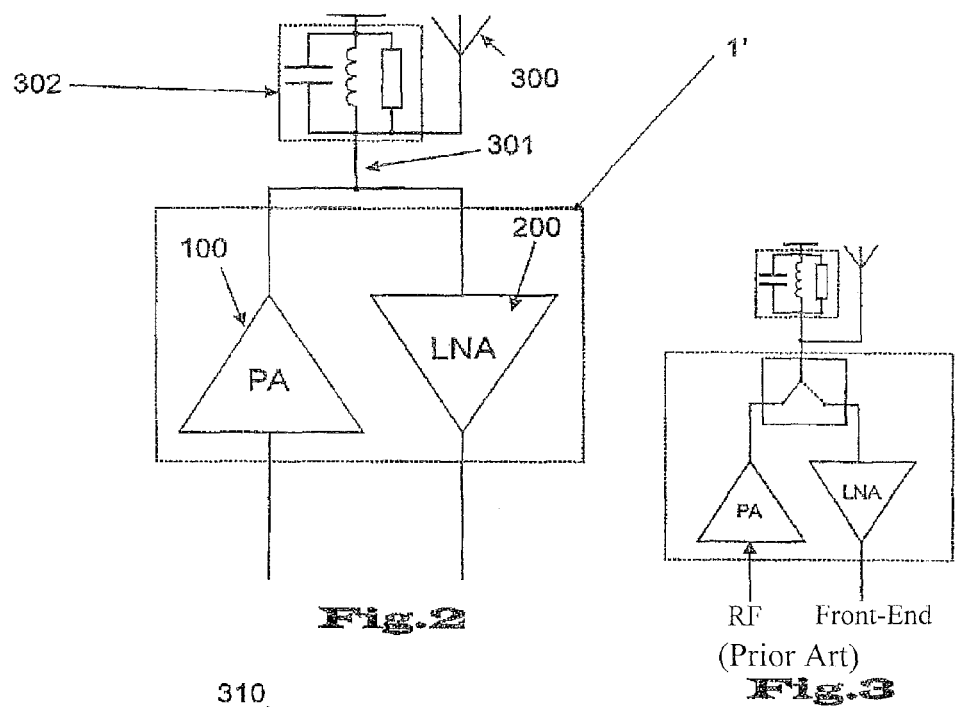
Fig.2
Fig.3 (Prior Art)
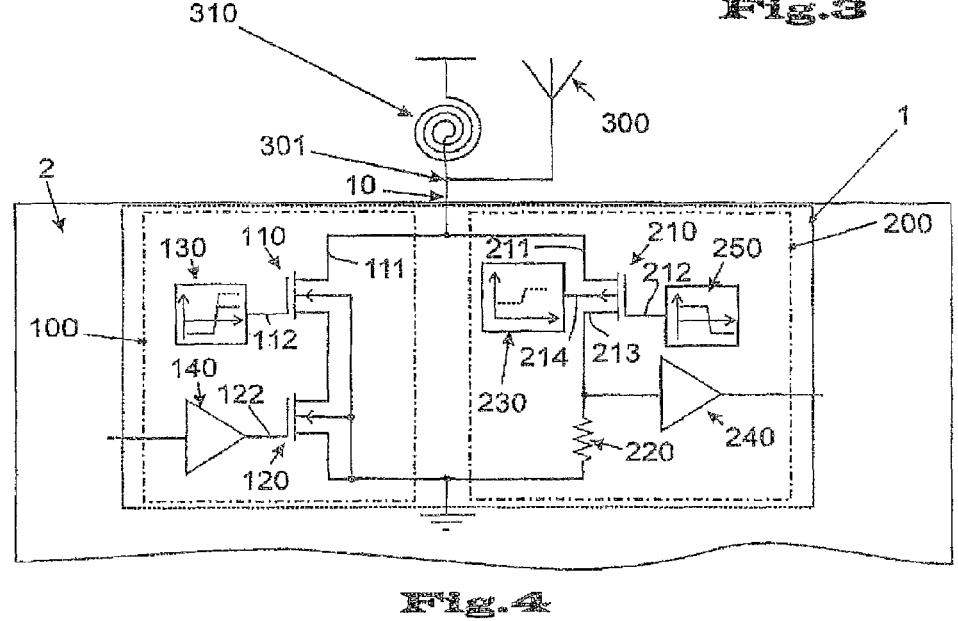
Fig.4

US 8,711,831 B2

FRONT END FOR RF TRANSMITTING-RECEIVING SYSTEMS WITH IMPLICIT DIRECTIONAL CONTROL AND TIME-MULTIPLEXING METHOD IN SUBMICRON TECHNOLOGY

CROSS-REFERENCE TO RELATED APPLICATIONS

This application claims priority to International Application Serial No. PCT/EP2009/051095 filed Jan. 30, 2009, which claims priority to German Application No. DE 102008000473.1 filed Feb. 29, 2008.

Embodiments of the presented invention pertain to the technical field of radio frequency (RF) transmitters and receivers shortly named transceivers, and in particular, to RF-amplifiers in antenna front-ends integrated on a single chip.

BACKGROUND

Most of the used blocks are already known technology like the symmetric wideband amplifier for the Power Amplifier represented by a differential amplifier in cascode structure and the common base (common gate) differential Low Noise Amplifier (LNA) in the receiving path. Also the use of transistors in Complementary Metal Oxide Semiconductor Technology (CMOS) for switches is well known. Especially n-type and p-type Metal Oxid Semiconductor Field Effect Transistors especially (NMOSFET and PMOSFET) are used to construct Transmission Gates or Analog Switches. Most of these basic circuits may be found in "Halbleiter-Schaltungstechnik" of Tietze and Schenk, published by Springer or "CMOS Analog Circuit Design" of Allen and Holberg published Oxford University Press.

A typical RE-transceiver is presented in the Radio communication apparatus of EP 1 176 709 A2 showing a typical front-end of actual designs. The need of a disadvantageous additional switch to commutate the transfer direction from and to the antenna is shown.

Most transceivers prefer common source configurations to common gate for the LNA especially resistively matched LNAs or feedback LNAs and inductively-degenerated LNAs.

An Ultra Wide Band CMOS Transceiver with common gate input stage of NMOS devices has been presented by Razavi and others in IEEE Journal of Solid-State Circuits Vol. 40 in December 2005. This circuit also allows direct (implicitly) sharing of the receiver antenna with the transmitter.

A 0.18 µm Thin Oxide CMOS Transceiver Front-End with Integrated TX/RX Commutator for Low Cost Bluetooth Solutions has been published by Vincent Knopik and Didier Belot of STMicroelectronics in 2003 (ESSCIRC Poster 24). This Front-End does not use an antenna switch. The main idea is to put the device (either PA or LNA) in power down mode when it is not active. That solution uses only one pin for both RF-input and output. The LNA impedance is matched to the antenna, and the PA output's impedance is optimised for the LNA. The LNA uses common gate topology with NMOS devices.

OBJECTS AND SUMMARY OF THE INVENTION

Based on existing technologies as quoted in the literature above, an integrated circuit was looked for, allowing low cost integration of radio-frequency (RF) transceivers—especially for quad-band ISM applications. To achieve cost reduction the number of antennas and the number of passive matching elements (Inductance, Capacitance and Resistance) should be minimized. Also the device area of silicon should be minimized.

Since the target application based on Time Division Duplex communication allows the usage of only one antenna, the need for transmit/receive (TX-RX switches) should be avoided. A primary task of the invention is to avoid the use of high frequency analog signal switches between the RF-port and the antenna. A further task is to use the same matching elements for both communication directions allowing a single configuration and adjustment for broadcasting and receiving. Finally, the RF-front-end amplifiers shall be designed to achieve the required signal quality and signal to noise ratio and the required signal damping of the direction path which isn't used. Beside NMOS devices the implementation of a PMOSFET in common gate configuration shall be considered in order to reduce the number of cost intensive parts compared to the given state of the art.

An innovative step is represented in the implicit use of disabling the transfer function by manipulating the bias voltage at the gates and bulks of some transistors.

Only one antenna and the same matching elements for a wireless RF-transceiver front-end are required for both RF-communication directions with the help of implicit direction control. Time division duplex communication is the basic requirement. This front-end is primarily used in Time Division Multiple Access Communication (TDMA) transceivers. A target application is a quad-band ISM transceiver. Used technologies are submicron-technologies especially 0.18 µm CMOS (Complementary Metal Oxide Semiconductors) or BiCMOS—(Bipolar CMOS)—technology. The front-end of the transceiver consists of two blocks that are processed on the same integrated circuit.

The first block shows a Power Amplifier (PA) output stage, which uses a transistor cascode circuitry in open-drain-configuration for the last stage of the signal amplification to drive an external connectable RF-antenna. Advantageous is that the cascode-transistor is serving as a common-gate-transistor with constant biasing during the broadcasting (TX)-period. During receive (RX) period controlling means are used to change the gate-potential of the cascode transistor in order to isolate the TX-path from the antenna.

The second block is a Low Noise Amplifier (LNA). Its input stage is advantageously built by a p-channel metal oxide semiconductor field effect transistor (PMOSFET) in common-gate configuration that implicitly is used to disconnect the RX-part of the transceiver from the antenna. In this case especially an enhancement type of PMOSFET is used. The electrical disconnection is supported through its bulk by means for changing the bulk's voltage potential from source voltage potential to a level above the source voltage potential.

In order to generate a receive-signal voltage-drop, the drain of the PMOSFET of the LNA input stage is electrically connected to a resistive load. A second amplifier stage increases the signal gain of the received signal to a suitable level especially for a radio frequency signal mixer. The gate of the PMOSFET is set to a low bias voltage during the RX periods of the transceiver. By forcing the gate to positive supply voltage the antenna voltage is pinched off at the input stage. This disables the receiving, especially during broadcasting. For test purposes it may be possible to keep the RX path opened to read back the driving signal of the PA. In this case the gate may be controlled by changing the bias voltage during receiving for damping the output signal to a level required at the input of the LNA's deeper amplifier stage. Beside the modes for broadcasting, receiving and testing a fourth mode may be inactive, which means the antenna is high ohmic decoupled from the transceiver by its outmost active elements.

As one aspect of the present invention and depending on the available semiconductor process, the main transistor of the cascode circuitry of the PA output stage is a bipolar junction npn-transistor or an n-channel metal oxide semiconductor field effect transistor (NMOSFET). In case of an NMOSFET an enhancement type is preferred. The base or respectively the gate of this output stage transistor is electrically connected to the output of a preamplifier.

Another aspect of this invention is that the gate of the cascode transistor of the PA is applied to a higher voltage potential than the drain-voltage of this transistor. This allows avoidance of the voltage loss of the cascode-transistor due to its threshold voltage at broadcasting.

Preferably a charge pump is used to generate the additional voltage potential beyond the positive supply voltage $V_{DD}$ and the negative supply voltage $V_{SS}$ which is higher than $V_{DD}$ at least the step of the threshold.

According to another aspect of this invention, an open drain terminal of the PA output stage and an open source terminal of the LNA input stage are electrically connected and led to the same port or connected at the same port of the integrated circuit. This port is the antenna connection port.

The matching elements are outside of the device and connected to a positive supply voltage $V_{DD}$ which drives the current either though the open drains of the PA output stage or through the open sources of the LNA input stage.

Especially if the open drain terminal of the PA output stage and the open source terminal of the LNA input stage are not connected to the same port, these terminals advantageously electrically contact the same antenna at least approximately at the same point.

According to a further aspect of the invention, an open drain terminal of the output stage of the PA and an open source terminal of the input stage of the LNA use the same additional matching components. This allows reducing trimming or adjusting effort. The main matching component may be an external tuning coil, which is the same for both, the TX part and the RX part of the transceiver.

Another important aspect is that all stages of the amplifiers of the PA and the LNA are symmetrically differential amplifiers.

This results in a differential pair of outputs at the PA output stage and a differential pair of inputs at the LNA input stage. These differential input and output terminals advantageously use the same differential input-output terminal or are at least electrically connected to the same differentially driven antenna. The ports may be connected to suitable connections of a loop antenna. This antenna is unique and acting for both periods—for broadcasting and receiving.

As a further aspect of the invention the differential outputs of the PA output stage and the differential inputs of the LNA input stage may be electrically connected to the same additional matching components especially to the same external tuning coil(s).

The innovation is detailed described in following preferred embodiments:

FIG. 1 is a block diagram of a sample of an RF-transceiver circuit using the invented front end.

FIG. 2 is a detail 321 out of FIG. 1 with the small difference that the connection point 301 is placed outside the front end 1.

FIG. 3 is a typical prior art configuration using high frequency TX/RX-switches.

FIG. 4 is a more detailed representation of the invented RF-transceiver front end 1 according to the detail 321 of block diagram in FIG. 1, showing schemata of the preferred embodiments of the Power Amplifier (PA) 100 and the Low Noise Amplifier (LNA) 200 here only in a non differential incorporation.

Figure 1:
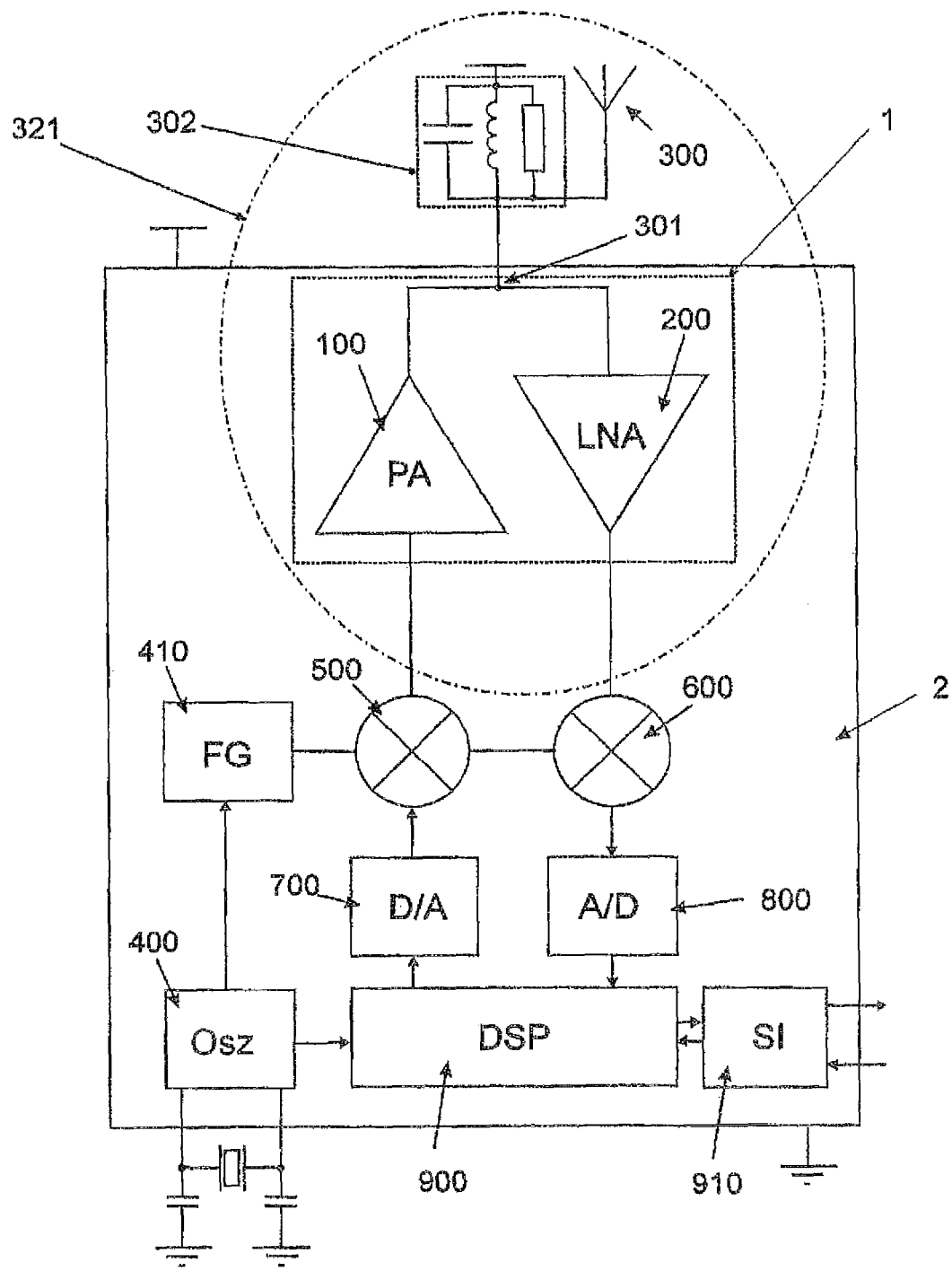

A typical integrated RF-transceiver is modulating base band signals into upper channels for radio transmission and demodulating radio signals into base band. The block diagram in FIG. 1 shows a crystal oscillator 400 as a reference frequency source and a frequency generator 410. The frequency generator may be a voltage controlled oscillator in a phase locked loop architecture and allows defining the mixing frequency for the mixer 500 or it allows synthesis and modulation of the transmit-frequency. The (filtered) RE-output signal needs to be amplified by the PA 100. The output of the PA is normally connected to the broadcasting antenna. The matching elements are adapted to the requirements for best transmission.

In the RX-path a front end amplifier is required to bring the RF-signal of the receiving antenna to the input of a mixing stage 600 to get the RF-modulated data down to the base band. A digital to analogue signal converter (D/A) 700 and an analogue to digital converter (A/D) 800 are shown in the example changing from the digital base band domain into the analog signal domain. Digital Signal Processing (DSP) 900 is carried out to bring the data to and from the required digital format. A Serial Interface (SI) 910 may be used to communicate with other integrated circuits like micro-controllers.

The application area is wide. All types of TDMA supported RF-communication protocols may use the structure, like Bluetooth-transceivers or Wireless Local Area Network-interfaces (WLAN). A quad band ISM transceiver is a favourite application of the invention.

The invention is focused on part 321 in FIG. 1. The rest of the integrated circuitry is many-faceted. The block 1 of the shown integrated circuit 2 is the transceiver front-end. This is the outmost part of the circuit towards the antenna 300. There is only one (advantageously differential) connection point 301 for the antenna to the integrated circuit in this example. At this point the RF-transmission-power is adaptively coupled into the antenna resistance. The typical supply voltage used in such a circuit is 1.8 Volt which is a process typical value for 0.18 μm CMOS or BiCMOS technologies. To supply the input stage of the receiver and the output stage of the transmitter, this point is connected to the supply voltage potential $V_{DD}$ (here 1.8 Volt). Matching elements 302 are foreseen to adjust the antenna and to filter the required RF-bandwidth. The input stage is a part of the LNA 200 and the output stage a part of the PA 100.

FIG. 2 shows the RF-transceiver front-end that is considered in the presented invention. It is not necessary to combine the output of the PA and the input of the LNA internally. In some cases, especially for test purposes, it might be advantageous to lead both connections to separate ports and the short is carried out externally, compare the block border 1 in FIGS. 1 to 1' in FIG. 2.

As most prior art circuits require special RF-suitable TX/RX switches that need low noise and low power loss and are not cheap in construction, the presented invention is a smart alternative. To existing switchless transceiver-designs the advantage is provided by the reduced number of required components.

FIG. 3 shows a typical prior art arrangement of a Time Division Duplex RF-front end. In many cases, the switches are situated outside the integrated circuit.

Figure 6:
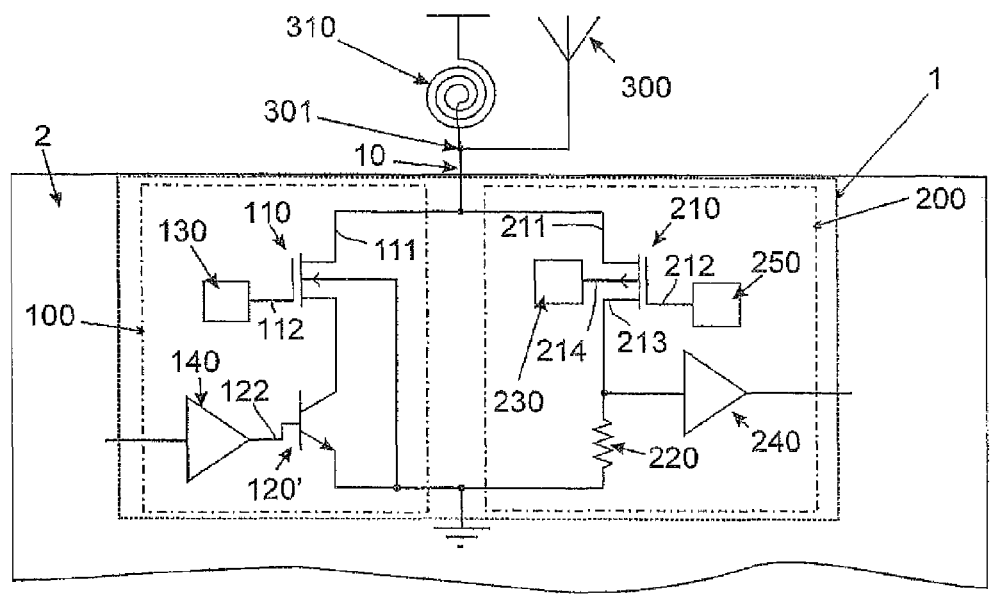
FIG. 6 is another embodiment comparable to FIG. 4 using a bipolar junction transistor instead of the main NMOSFET in the PA.

The main power amplifier output stage of the PA 100 is designed using a cascode circuitry in open drain configuration. In FIG. 4 the main transistor 120 is an NMOSFET (enhancement type—normally off) whose gate is controlled by the output voltage of a standard Pre-Amplifier 140. FIG. 6 shows an alternative bipolar junction transistor 120' that may be implemented in a BiCMOS process technology. The cascode transistor 110 in these configurations is an NMOSFET in common gate configuration while the PA is active. Thus the gate is switched to $V_{DD}$ during broadcasting active. The gate 112 of this FET 110 is controlled to achieve the high ohmic disconnection from the antenna 300 and the matching component. As indicated in FIG. 4 by block 130 this is done by forcing the gate to $V_{SS}$ or ground potential. In a 0.18 µm process the typical voltage of 1.8V may be applied in transmission mode. A switching to a level above $V_{DD}$ minimizes the threshold voltage drop at the cascode transistor. This voltage needs to be generated internally for example with the help of a charge pump. Thus the bias at the gate does not influence the transconductance of the main transistor 120 or 120' and the resulting gain is depending on the resistive load connected to the open drain antenna port.

Figure 5:
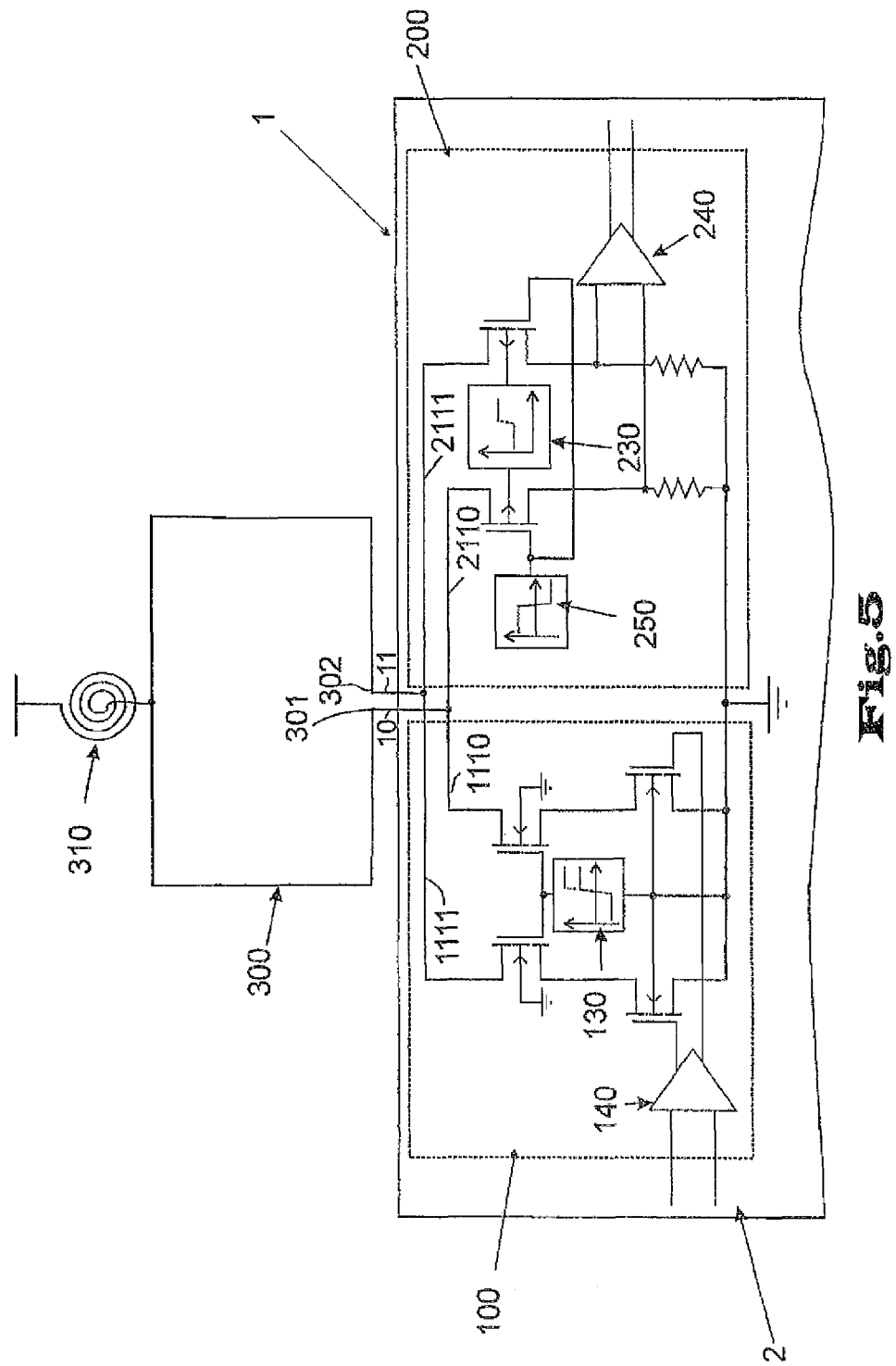
FIG. 5 shows the preferred differential solution of the RF-transceiver front end 1.
Figure 7:
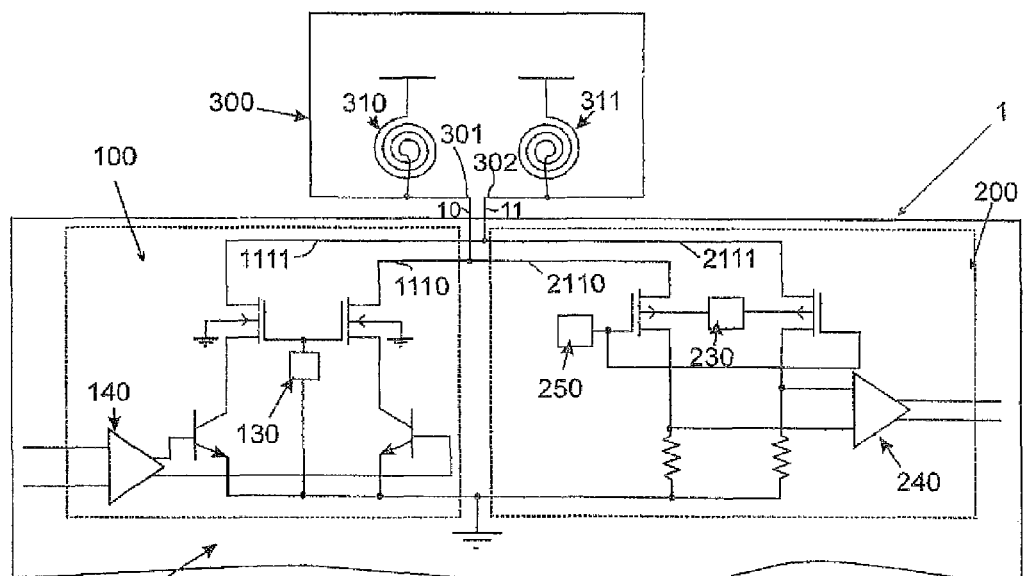
FIG. 7 shows the differential schematic according to FIG. 6. Here, two matching coils are involved at the antenna.

A preferred embodiment of the PA is differential. The signal branches in FIG. 4 and FIG. 6 only show half of the realized design. FIG. 5 and FIG. 7 show the more detailed schemata of the typical front-end configurations. Therefore the Pre-Amplifier 140 is differential and has a differential input for the output of deeper structures (the HF-synthesizer, modulator or mixer). Each contact of the differential output of the Pre-Amplifier is connected to one gate or one base of the main transistors (NMOSFET (FIG. 5) or BJT (FIG. 7)). These form together with the cascode-NMOSFETs a differential amplifier in cascode-circuit.

The controlling signal for the gates of the cascode NMOSFETs can be the same. The source represents the enable/disable signal for the broadcasting and is controlled from digital parts of the transceiver. The gates of the differential amplifier are switched off by setting the level to ground $V_{SS}$. In broadcasting the gates are forced to signal $V_{DD}$ or to a higher internal generated voltage $V_{DD++}$. The open drain outputs of the differential amplifier are connected to the matching elements and the antenna. This antenna is a loop antenna 300 in the examples of FIG. 5 and FIG. 7. In FIG. 7 a coil represents the major matching element for each single ended output. These represent a certain inductance that is connected to $V_{DD}$. This $V_{DD}$ is the supply voltage of the output stage. Instead of two coils, also one coil can be connected as a matching element. This is demonstrated in FIG. 5.

Taking a closer consideration to the LNA 200 in FIG. 2, the single ended embodiment of the LNA is shown in FIG. 4 (and FIG. 6). A common gate structure with resistive load 220 at the drain 213 incorporates the LNA primary stage. The output of a PMOSFET 210 (enhancement type—normally off)—amplifier is connected to a second amplifier stage 240. The behaviour of the PMOSFET 210 changes from active to disabled by changing the bias voltages at the bulk 214 and the gate 212 of the transistor 210 with the controlling blocks 230 and 250. The bulk controlling block 230 provides a positive supply voltage potential $V_{DD}$ in receiving mode and a separate reference voltage $V_{DD++}$ which is higher than $V_{DD}$ during broadcasting mode. The additional voltage may be internally generated, and could be the same potential as described above for the gate 112 of the cascode transistor 110 during broadcasting. The forced high bulk voltage prevents infringing the broadcasting by the source of the PMOSFET 210.

The gate controlling block 250 provides the bias voltage for the operating point of the common gate configuration in receiving mode and is forced to ground to turn off the PMOSFETs source-drain connection.

The LNA 200 also should be designed symmetric differential as shown in FIG. 5 and FIG. 7. In this case the $2^{nd}$ stage amplifier is differential too and contacts the differential output of the PMOSFETs. The blocks 230 and 250 for providing the bulk and the gate biasing (or to disable the input stage) of the Low Noise Differential Amplifier can be connected to both bulks—respectively gates of the transistor pair.

This concept allows to share the TX-output or differential TX output port of the PA with the RX-input or differential RX input port of the LNA without any analog switch. The drain 111 of the NMOSFET 110 can be connected to the source 211 of the PMOSFET 210 having only low impact on the matching configuration (FIG. 4, FIG. 6). In differential configuration the drains 1110, 1111 are directly connected to the sources 2110, 2111.

The shown embodiments are only representative for the principle, and different matching components or other embeddings are also part of this invention as far as the front-end touches the same claims.

What is claimed is:

1. RF-transceiver front-end comprising:
   a. a Power Amplifier (PA) output stage comprising a transistor cascade circuitry that acts in open-drain-configuration during broadcast (TX) period as a common-gate-transistor with constant biasing, and acts in the open-drain-configuration during the receive (RX) period to change potential of the gate of the transistor cascade circuitry such that the path utilized during the TX period from the antenna is isolated; and
   b. a Low Noise Amplifier (LNA) input stage comprising:
      a p-channel metal oxide semiconductor field effect transistor which transistor is in common-gate configuration and its bulk changes the bulk's voltage-potential from a level equal to the source voltage potential to a level above the source voltage potential of this PMOSFET,
      wherein the RF-transceiver front-end provides direction control for Time Division Multiple Access Communication (TDMA) for a quadband ISM transceiver implemented on a single integrated circuit.

2. The RF-transceiver front-end of claim 1, wherein drain of field effect transistor of the LNA input stage is electrically connected to a resistive load and to input of a second amplifier stage and gate of the field effect transistor is set to a bias voltage level to enable receiving or this gate is forced to positive supply voltage to pinch off antenna voltage.

3. The RF-transceiver front-end of claim 2, wherein a main transistor of the transistor cascade circuitry of the PA output stage is an n-channel metal oxide semiconductor field effect transistor and wherein base or respectively gate of the transistor is electrically connected to output of a preamplifier.

4. The RF-transceiver front-end of claim 1, wherein main transistor of the transistor cascade circuitry of the PA output stage is an n-channel metal oxide semiconductor field effect transistor and wherein base respectively gate of the transistor is electrically connected to output of a preamplifier.

5. The RF-transceiver front-end of claim 1, wherein the transistor cascade circuitry applies a voltage potential that is higher than drain voltage potential of this transistor.

6. The RF-transceiver front-end of claim 1, wherein a charge pump generates a voltage-level whose height is above maximum positive supply voltage.

7. The RF-transceiver front-end of claim 1, wherein when an open drain terminal of the PA output stage and an open source terminal of the LNA input stage are not electrically connected to same port of the single integrated circuit, then these terminals electrically contact same antenna at least approximately at same point.

8. The RF-transceiver front-end of claim 1, wherein an open drain terminal of the PA output stage and an open source terminal of the LNA input stage are electrically connected to additional matching components especially to a external tuning coil.

9. The RF-transceiver front-end of claim 1, wherein all stages of the PA and the LNA are symmetrically differential.

10. The RF-transceiver front-end of claim 9, wherein differential outputs of the PA output stage and differential inputs of the LNA input stage use same differential port terminals and/or contact electrically at suitable connections of same differentially driven loop antenna that is unique transmit- and receive-antenna of the transceiver front-end.

11. The RF-transceiver front-end of claim 10, wherein the differential outputs of the PA output stage and the differential inputs of the LNA input stage are electrically connected to external tuning coils.

* * * * *